United States Patent [19]

Sasaki

[11] Patent Number: 5,250,800
[45] Date of Patent: Oct. 5, 1993

[54] PHOTO-ELECTRIC INTEGRATED CIRCUIT DEVICE WITH OPPOSITE PHASE AMPLIFIERS INTO LOGIC CIRCUITRY

[75] Inventor: Goro Sasaki, Yokohama, Japan

[73] Assignee: Sumitomo Electric Industries Ltd., Osaka, Japan

[21] Appl. No.: 953,804

[22] Filed: Sep. 30, 1992

[30] Foreign Application Priority Data

Oct. 4, 1991 [JP] Japan .................................. 3-257802
Oct. 4, 1991 [JP] Japan .................................. 3-257809

[51] Int. Cl.⁵ .......................................... H01J 40/14
[52] U.S. Cl. ........................... 250/214 A; 250/214 LS
[58] Field of Search ........ 250/214 R, 214 A, 214 LS; 307/311

[56] References Cited

U.S. PATENT DOCUMENTS 5,073,717 12/1991 Sturzebecher et al. ........ 250/214 A

Primary Examiner—David C. Nelms
Attorney, Agent, or Firm—Beveridge, DeGrandi, Weilacher & Young

[57] ABSTRACT

There is disclosed a photo-electronic integrated circuit device comprising a first and second output terminals for supplying first and second output signal of opposite polarities to an external differential input logic circuit, a photo-detecting device for converting an input light signal to an electrical signal, a first amplifier for amplifying the electrical signal of the photo-detecting device and outputting the same from the first output terminal as the first output signal, and a second amplifier for amplifying the output of the first amplifier and outputting the second output signal having the opposite phase to that of the first output signal, from the second output terminal.

10 Claims, 11 Drawing Sheets

GAIN = 1

PHOTO-ELECTRIC INTEGRATED CIRCUIT DEVICE WITH OPPOSITE PHASE AMPLIFIERS INTO LOGIC CIRCUITRY

BACKGROUND OF THE INVENTION

1. Field of the Invention

The present invention relates to a photo-electronic integrated circuit device having a photo-emission/detection element and an electric element and used in a photo-detector of optical fiber communication.

2. Related Background Art

Figure 1:
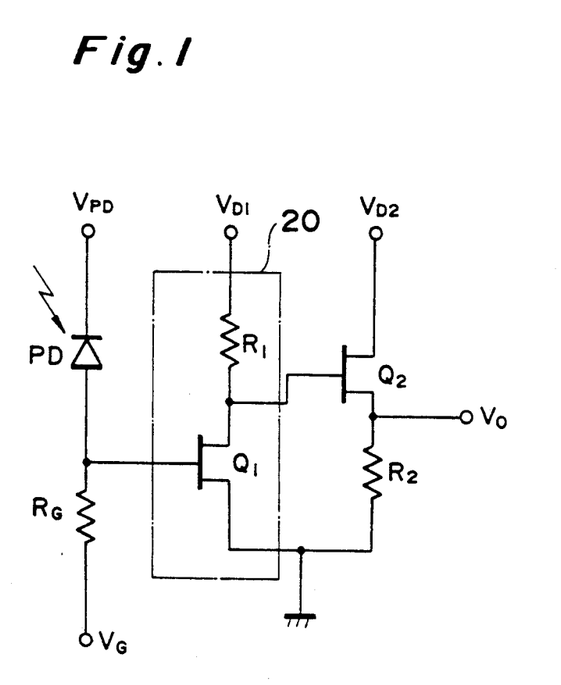
FIG. 1 shows a circuit diagram of a configuration of a prior art OEIC.

An example of a prior art photo-electronic integrated circuit device (OEIC) is shown in FIG. 1. The OEIC is monolithically formed on one semiconductor substrate and comprises a photo-diode PD, resistor RG, R1 and R2, and high electron mobility transistor (HEMT) Q1 and Q2. In the circuit of FIG. 1, the photo-diode PD and the resistor RG constitute a photo-detector stage, the resistor R1 and the transistor Q1 constitute an amplifier stage, and the transistor Q2 and the resistor R2 constitute a source follower stage.

In the prior art OEIC, since a light signal is very small in the photo-detector stage which converts the light signal to an electrical signal, the amplifier stage which amplifies the output signal of the photo-diode PD has a very high sensitivity. Accordingly, when an electrical noise signal is externally applied, a final stage of the amplifier stage is significantly affected by the noise.

The transistor Q1 and the load resistor R1 in the amplifier stage constitute an inverting amplifier 20. In order for the inverting amplifier 20 to have a unity gain, it is designed such that a product of a conductance of the transistor Q1 and the load resistor R1 is unity. When such a design is applied to a field effect transistor comprising an AlInAs layer and a GaInAs layer on an InP substrate, a voltage of higher than 4 volts is applied across the source and the drain of the transistor Q1 assuming that a power supply voltage VD1 is 5 volts. Since this voltage essentially corresponds to a breakdown voltage between the source and the drain of the transistor Q1, it causes a problem of likelihood of the breakdown of the transistor.

SUMMARY OF THE INVENTION

It is an object of the present invention to solve the problems encountered in the prior art OEIC and improve an anti-noise characteristic of an electrical signal in the OEIC.

It is another object of the present invention to prevent the breakdown of a transistor of an inverting amplifier of the OEIC where the inverting amplifier has a gain larger than unity.

In order to achieve the above objects, the photo-electronic integrated circuit device of the present invention comprises: first and second output terminals for supplying first and second output signal of opposite polarities to an external differential input logic circuit; a photo-detecting device for converting an input light signal to an electrical signal; a first amplifier for amplifying the electrical signal of said photo-detecting device and outputting the same from said first output terminal as said first output signal; and a second amplifier for amplifying the output of said first amplifier and outputting said second output signal having the opposite phase to that of said first output signal, from said second output terminal.

In the photo-electronic integrated circuit device of the present invention the photo-electronic integrated circuit device may be monolithically formed on an InP substrate, output buffers may be provided at outputs of the first and second amplifiers, or the output buffers may be source followers including constant current circuits.

A level shift circuit may be provided in the output of the first amplifier for shifting a voltage level of the output of said first amplifier to output said first output signal and the output to said second amplifiers.

The first amplifier may include a signal amplifying transistor and a constant current circuit as a load to said transistor, and the transistor may be one of J-FET, HEMT, MISFET and MESFET.

The second amplifier may include a signal amplifying transistor and a device having a predetermined voltage drop and connected to at least one of a drain or a collector, and a source or an emitter of said transistor, and the device having the predetermined voltage drop may include a plurality of series-connected diodes, or a plurality of diodes and a resistor connected in series.

In accordance with the present invention, the OEIC produces the opposite output at its two output terminals. The output of the amplifier OF THE OEIC is applied to the first output terminal in the same phase. The output of the amplifier is also applied to the second output terminal but with the inverted phase through the inverting amplifier.

When a noise is externally applied, the noise appears in the output signals at the first and second output terminals in the same phase. The differential input logic circuit, for example such as an ECL, is connected in the rear stage of the OEIC, and a difference between the two output signals appearing at the first and second output terminals is amplified by the differential amplifier. Since the noises included in the output signals appear in the same phase, that is, they are common mode noises, the noises are eliminated by differentiating the output signals at the first and second output terminals. Accordingly, the photo-detector which is not substantially affected by the external electrical signal noise is attained.

In this manner, the output of the amplifier is applied to the first output terminal in the same phase, and the output of the amplifier is inverted by the inverting amplifier and it is applied to the second output terminal. The differential input logic circuit having the differential amplifier input stage which differentiates the two output signals appearing at the first and second output terminals is connected in the rear stage of the OEIC so that the noise components are eliminated by the differential amplifier and the photo-detector which is not affected by the external noise is attained.

Where an element having a predetermined voltage drop function (for example, a level shifting diode or a resistor) is connected to at least one of the drain (collector) and the collector of the transistor of the inverting amplifier, the voltage applied to the transistor may be rendered smaller than the power supply voltage by the voltage drop across the element, and the voltage applied between the drain (collector) and the source (emitter) of the transistor can be reduced.

In accordance with the present invention, since the level shifting means is connected to at least one of the drain (collector) and the source (emitter) of the transistor of the inverting amplifier, the voltage applied between the source and the drain or between the emitter and the collector of the transistor is reduced. When the inverting amplifier having the unity gain is constructed by the transistor, the break-down in the transistor is prevented.

The present invention will become more fully understood from the detail description given herein below and the accompanying drawings which are given by way of illustration only, and thus are not to be considered as limiting the present invention.

Further scope of applicability of the present invention will become apparent from the detailed description given herein after. However, it should be understood that the detailed description and specific examples, while indicating preferred embodiments of the invention, are given by way of illustration only, since various changes and modification within the spirit and scope of the invention will become apparent to those skilled in the art from this detailed description.

DETAILED DESCRIPTION OF THE PREFERRED EMBODIMENTS

An embodiment of the present invention is now explained with reference to the drawings.

Figure 2:
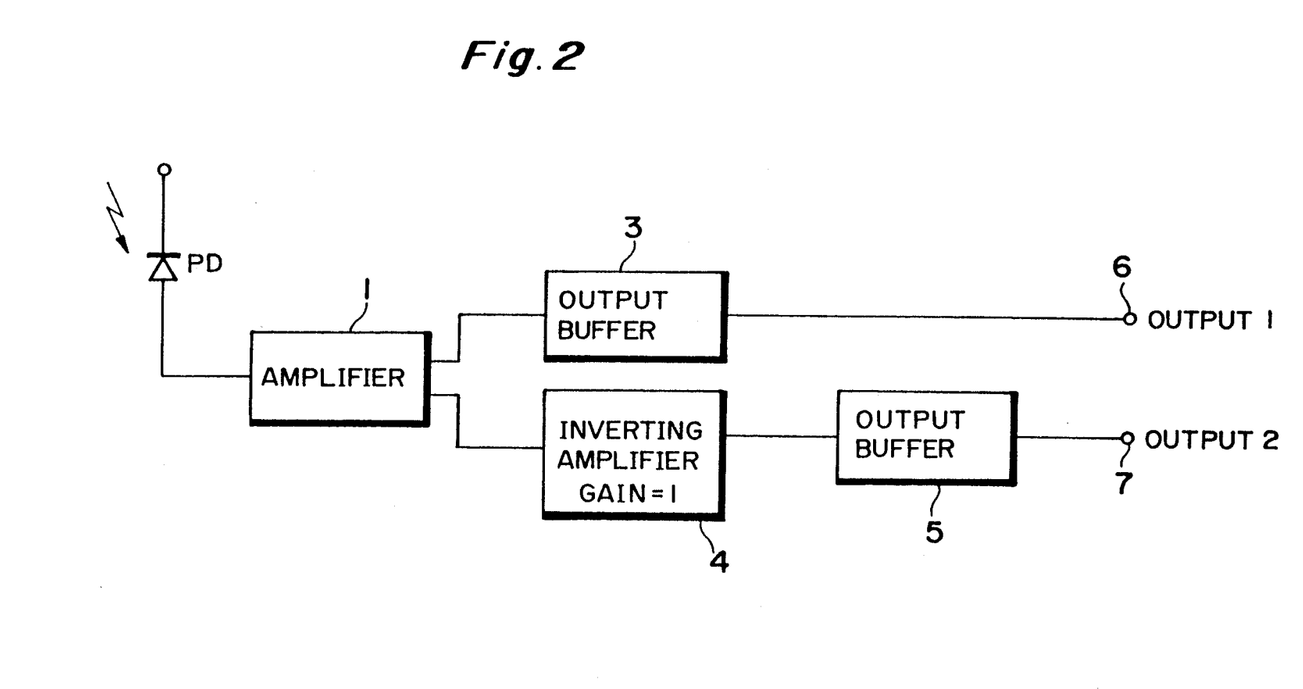
FIG. 2 shows a block diagram of a basic configuration of an OEIC in accordance with a first embodiment of the present invention.

FIG. 2 shows a basic configuration of the OEIC in accordance with a first embodiment of the present invention. The OEICC of the present embodiment basically comprises a photo-diode PD, an amplifier 1, an output buffer 3, an inverting amplifier 4 and an output buffer 5, which are monolithically formed on an InP substrate. The photo-diode PD converts an input light signal to an electrical signal, and the amplifier 1 amplifies the electrical signal detected by the photo-diode PD. The inverting amplifier 4 is supplied with the output of the amplifier 1, and inverts it with unity gain. The output buffers 3 and 5 prevent the affect by the connection of a circuit to a succeeding stage from appearing in a preceding stage. The output buffer 3 is supplied with the output of the amplifier 1 and produces an output signal of the same phase at an output terminal 6. The output buffer 5 is supplied with the output of the inverting amplifier 4 and produces an output signal of the opposite phase at an output terminal 7.

Figure 3A:
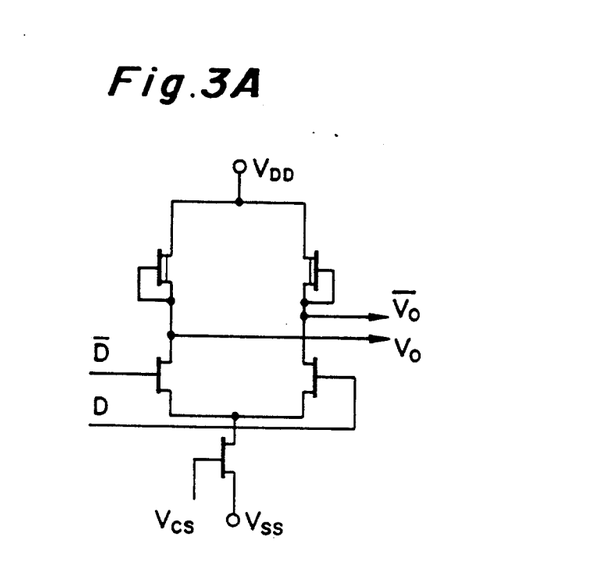
FIG. 3A shows a logic circuit to be connected to an output terminal of the OEIC of the present invention.
Figure 3B:
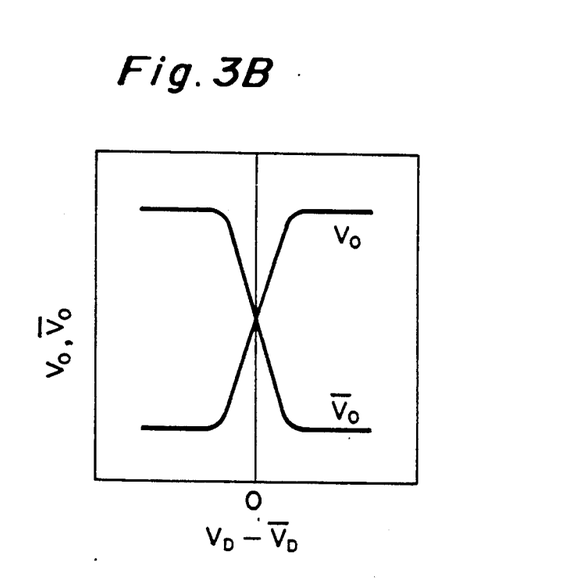
FIG. 3B shows a transmission characteristics of the logic circuit shown in FIG. 3A.
Figure 4:
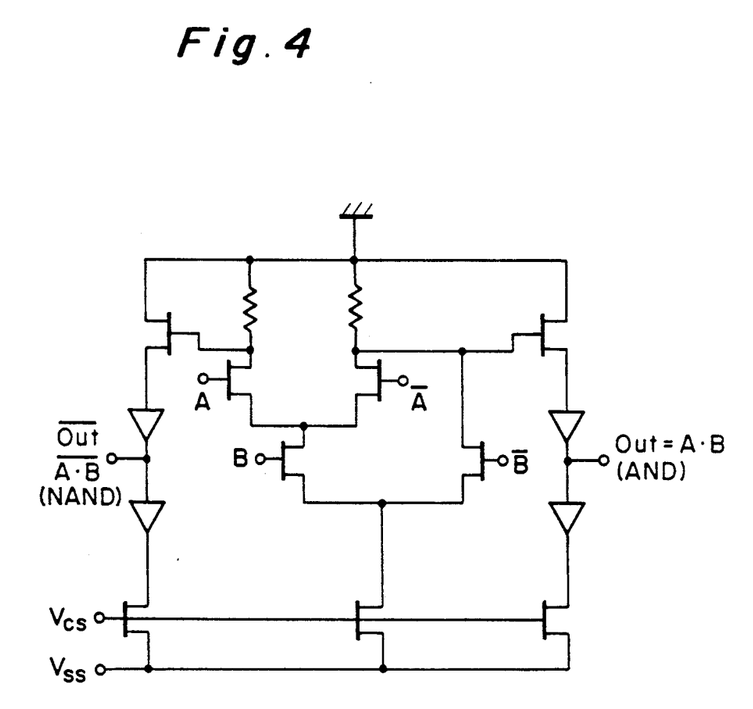
FIG. 4 shows a logic circuit to be connected to the output terminal of the OEIC of the present invention.

A differential input logic circuit is connected to the output terminals 6 and 7. FIGS. 3 and 4 shows examples of the logic circuit. It is essential that the input stage is constructed by a differential amplifier. FIG. 3A shows a differential input buffer which has a transfer characteristic as shown in FIG. 3B and produces outputs Vo and Vo' based on inputs D and D' of the opposite phases. FIG. 4 shows a differential input AND circuit which ANDs complementary inputs A and A' and complementary inputs B and B' to produce complementary output OUT and OUT'.

Figure 5:
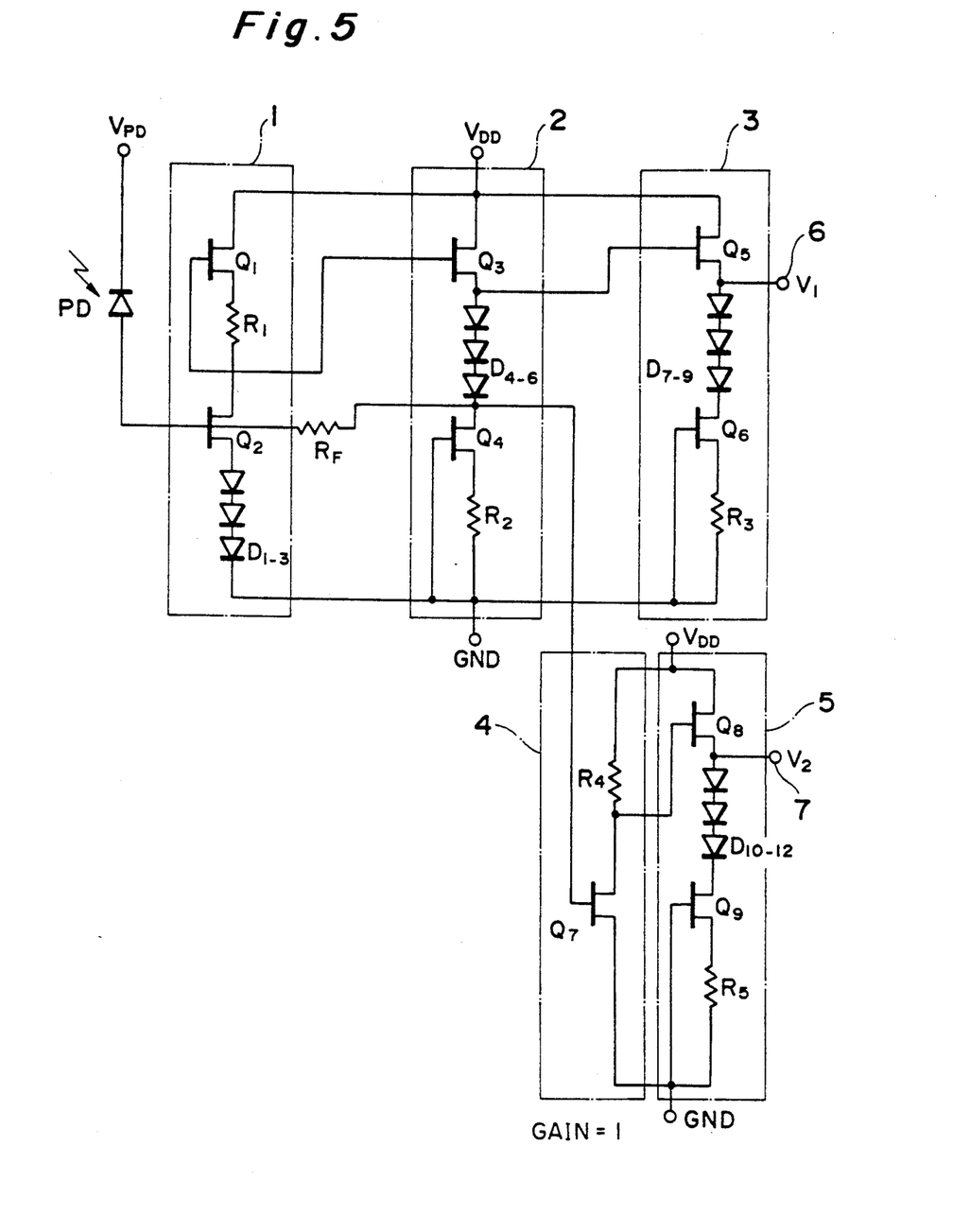
FIG. 5 shows a circuit diagram of a specific configuration of the OEIC in accordance with the first embodiment of the present invention.

FIG. 5 shows a specific circuit configuration of the OEIC having the basic configuration described above and comprises the respective blocks of FIG. 2, that is, the photo-diode PD, the amplifier 1, the level shift circuit 2, the output buffer 3, the inverting amplifier 4 and the output buffer 5. The level shift circuit 2 shifts a DC level of the output of the amplifier 1 to a predetermined bias level. The output of the level shift circuit 1 is applied to the output buffer 3 and the inverting amplifier 4. The respective blocks are explained below.

The amplifier 1 comprises a load by a constant current circuit including a transistor Q1 and a resistor R1, a transistor Q2 which receives the detection signal of the photo-diode PD and amplifies it, and level shifting diodes D1~D3, which are connected in series between a power supply voltage $V_{DD}$ and ground.

The level shift circuit 2 comprises a transistor Q3, level shifting diodes D4~D6, and a load by a constant current circuit including a transistor Q4 and a resistor R2, which are connected in series between the power supply voltage VDD and the ground. A gate of the transistor Q3 is connected to a drain of the transistor Q2 of the preceding stage.

The output buffer 3 comprises a transistor Q5, level shifting diodes D7~D9, and a load by a constant current circuit including a transistor Q6 and a resistor R3, which are connected in series between the power supply voltage VDD and the ground. A source of the transistor Q3 of the preceding stage is connected to a gate of the transistor Q5.

The inverting amplifier 4 comprises a resistor R4 and a transistor Q7 which are connected in series between the power supply voltage VDD and the ground. A gate of the transistor Q7 is connected to a drain of the transistor Q4 of the preceding stage. A voltage having the PC level thereof shifted by the level shifting diodes D4~D6 of the preceding stage is applied to the transistor Q7.

The output buffer 5 comprises a transistor Q8, level shifting diodes D10~D12, and a load by a constant current circuit including a transistor Q9 and a resistor R5, which are connected in series between the power supply voltage VDD and the ground. A gate of the transistor Q8 is connected to a drain of the transistor Q7 of the preceding stage. The transistor Q8 operates in response to the output signal of the inverting amplifier 4 of the preceding stage.

The output of the output buffers 3 and 5 are produced at the output terminals 6 and 7 connected to the sources of the transistors Q5 and Q8 of the respective buffers. An MSM or PIN photo-diode is used as the photo-diode PD of the OEIC, and junction type field effect transistors (FET's), HEMT's MISFET's or MESFET's are used as the transistor Q1~Q9.

The photo-diode PD is used for an application to light communication in a wavelength band of 1.3~1.6 μm and it can detect a light of shorter than 1.6 μm. It uses Inp for an n-layer and GaInAs as a p-layer, and a photo-sensing layer of artificial grating GaInAs having a multi-layer periodic structure is sandwiched between the n-layer and the p-layer.

A basic operation of the OEIC of the present embodiment is now described.

When a light signal is applied to the photo-diode PD, the detection signal by the photo-diode PD is amplified by the amplifier 1. The amplified signal is applied to the output terminal 6 through the output buffer 3 in the same phase, and the other output of the amplifier 1 is applied to the inverting amplifier 4. The phase is inverted thereby, and the resulting output is applied to the output terminal 7 through the output buffer 5. When an external noise is applied, the noise appears in the output signals at the two output terminals in the same phase because the circuit is on one chip, and they change in the same manner as the output signals do. That is, the noises are common mode noises. Since a difference between the output signal levels is always substantially constant without regard to the noise, it is eliminated by the differential input logic circuit connected to the output terminals 6 and 7.

Figure 6A:
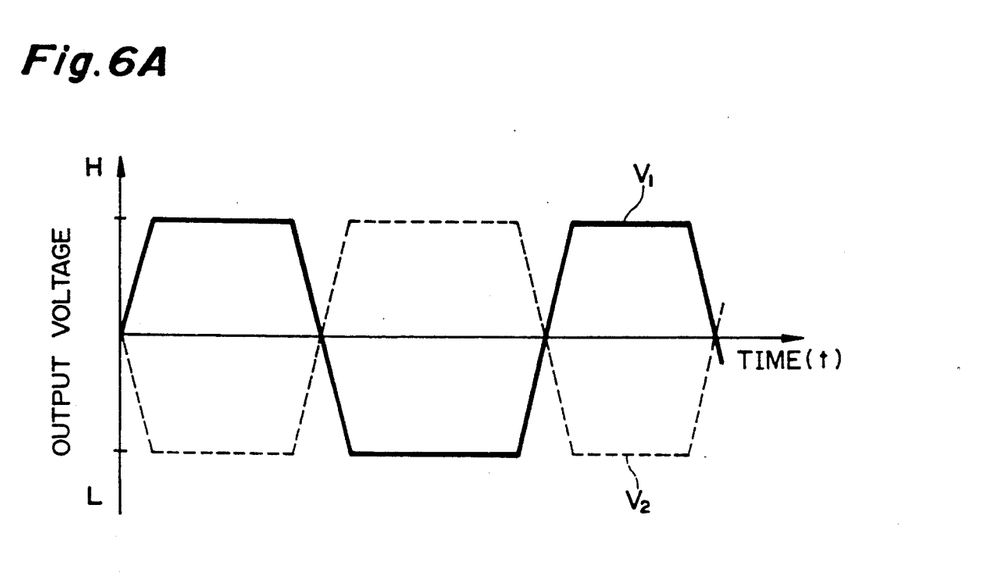
FIG. 6A shows waveforms of output signals applied to output terminals.

This is explained with reference to waveform charts. FIG. 6A shows waveforms when no external noise is applied.

The light signal is applied to the photo-diode PD of the OEIC and a signal waveform V1 shown by a solid line is produced at the output terminal 6. A signal waveform V2 having the inverted phase as shown by a broken line is produced at the other output terminal 7 because the inverting amplifier 4 is connected in the preceding stage.

Figure 6B:
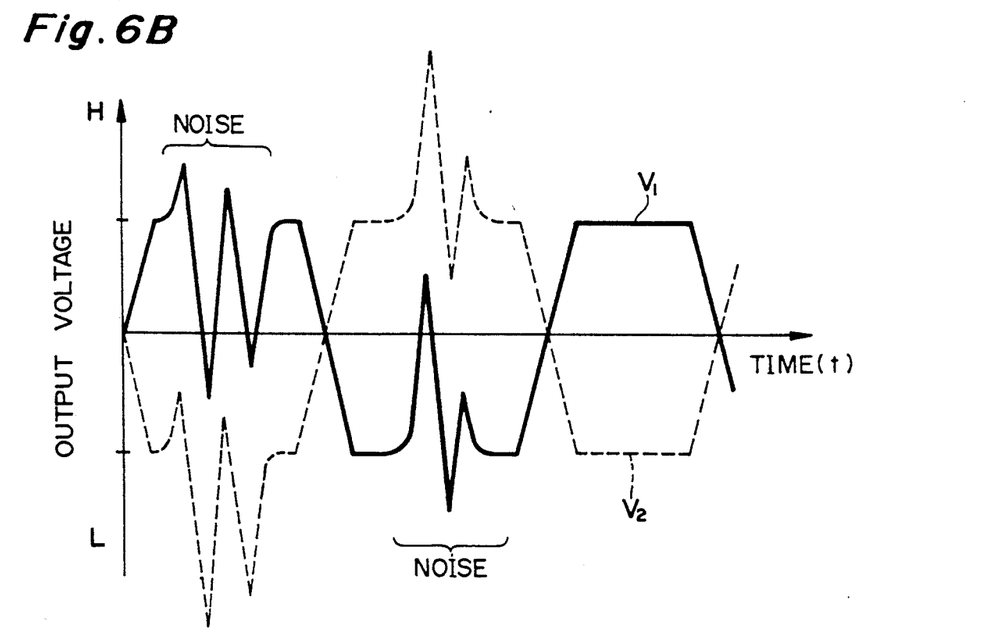
FIG. 6B shows waveforms of signals with noises.
Figure 7:
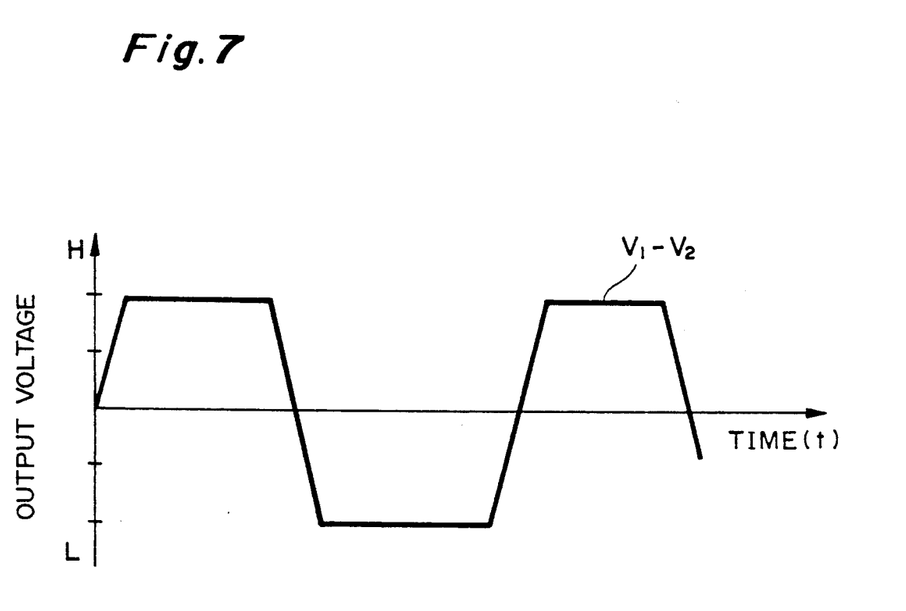
FIG. 7 shows a waveform of a difference between the output voltage applied to the two output terminals when the output signals include electrical signal noises.

When an electrical signal noise is externally applied to the output of the amplifier 1, the noise appears at the output terminals 6 and 7 as the common mode noise as shown in FIG. 6 (b) so that the output signals from these terminals are changed in the same manner. That is, the outputs appearing at the output terminals 6 and 7 have waveforms consisting of signal components of the opposite phases and noise components of the same phase. The logic circuit having the differential amplifier in the input stage thereof as shown in FIGS. 3 and 4 is connected to the rear stage of the OEIC. The logic circuit performs a predetermined logic arithmetic on the basis of a difference V1−V2 between the two signals appearing at the output terminals 6 and 7. As a result, the noise components are cancelled out as shown in FIG. 7 so that the electrical signal free of the noise component is produced.

In the present embodiment, the OEIC circuit is shown in FIG. 5 although the present invention is not limited to the specific circuit configuration but it may be a conventional OEIC with the addition of an inverting amplifier for inverting the output of the amplifier and the output terminal to which the output of the inverting amplifier is applied.

A second embodiment of the present invention is now explained.

Figure 8:
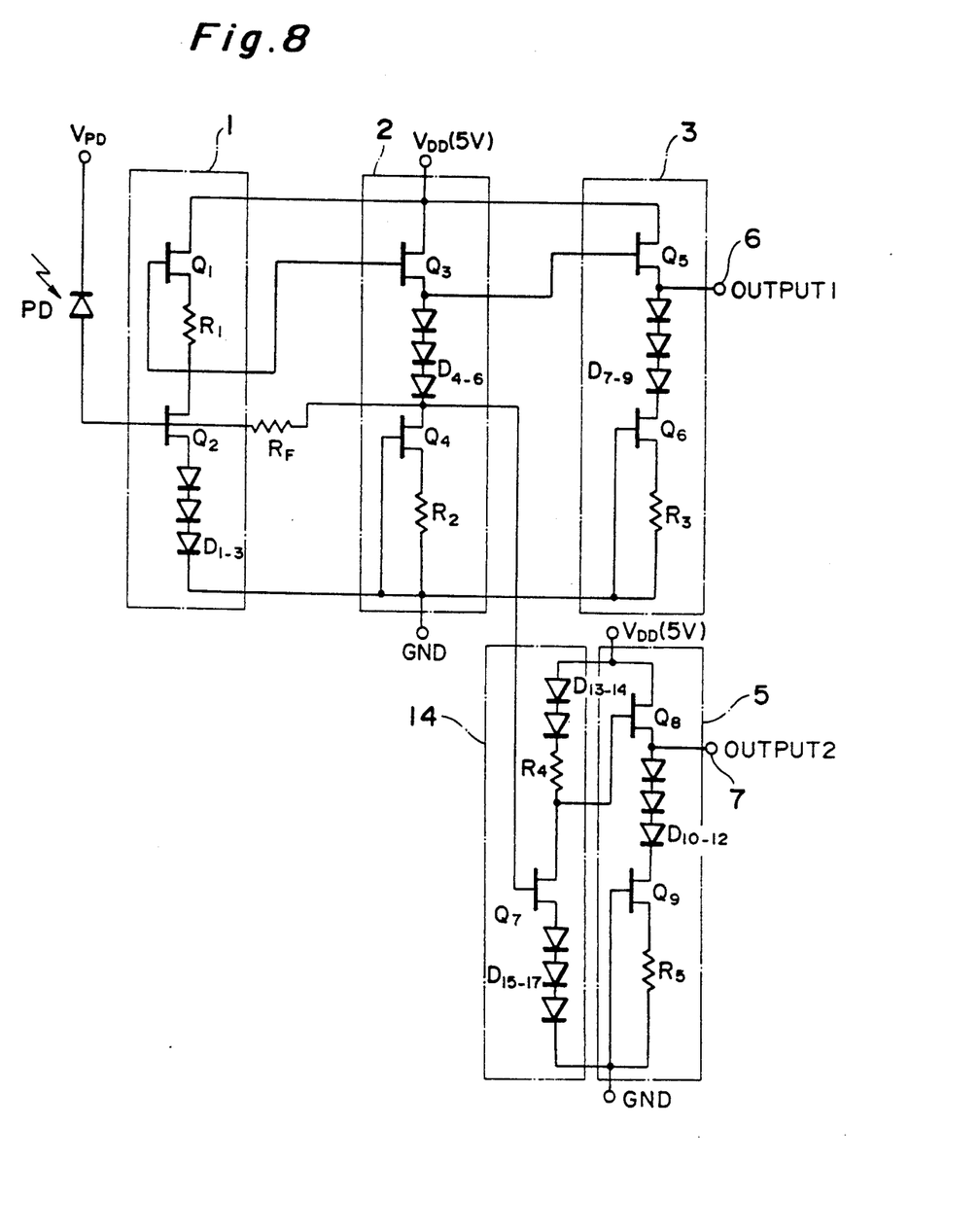
FIG. 8 shows a circuit diagram of a configuration of the OEIC in accordance with a second embodiment of the present invention.

FIG. 8 shows a circuit diagram of the OEIC in accordance with the second embodiment of the present invention. The OEIC is monolithically formed on an InP substrate as it is in the first embodiment, and comprises a photo-diode PD for converting an input light signal to an electrical signal, an amplifier 1 for amplifying the electrical signal detected by the photo-diode PD, a level shift circuit 2 for shifting a DC level of the output of the amplifier 1, an output buffer 3 to which the output of the level shift circuit 2 is applied, a unity gain inverting amplifier 4 for inverting the output of the level shift circuit 2, and an output buffer 5 to which the output of the inverting amplifier 4 is applied.

A differential input logic circuit is connected to output terminals 6 and 7 as it is in the first embodiment shown in FIG. 3 and 4. The respective blocks are explained below.

The amplifier 1 comprises a load by a constant current circuit including a transistor Q1 and a resistor R1, a transistor Q2 for amplifying the detection signal of the photo-diode PD, and level shifting diodes D1~D3, which are connected in series between a power supply voltage VDD and ground.

The level shift circuit 2 comprises a transistor Q3, level shifting diodes D4~D6, and a load by a constant current circuit including a transistor Q4 and a resistor R2, which are connected in series between the power supply voltage VDD and the ground. A gate of the transistor Q3 is connected to a drain of the transistor Q2 of the preceding stage.

The output buffer 3 comprises a transistor Q5 level shifting diodes D7~D9, and a load by a constant current circuit including a transistor Q6 and a resistor R3, which are connected in series between the power supply voltage VDD and the ground. A source of the transistor Q3 of the preceding stage is connected to a gate of the transistor Q5.

The inverting amplifier 4 comprises level shifting diodes D13 and D14, a resistor R4, a transistor Q7 and level shifting diodes D15~D17, which are connected in series between the power supply voltage VDD and the ground. A gate of the transistor Q7 is connected to a drain of the transistor Q4 of the preceding stage, and a voltage having a DC level thereof shifted by the level shifting diodes D4~D6 of the preceding stage is applied to the gate of the transistor Q7.

The output buffer 5 comprises a transistor Q8, level shifting diodes D10~D12, and a load by a constant current circuit including a transistor Q9 and a resistor R5, which are connected in series between the power supply voltage VDD and the ground. A gate of the transistor Q8 is connected to a drain of the transistor Q7 of the preceding stage, and the transistor Q8 operates in response to the output signal of the inverting amplifier 4 of the preceding stage.

The outputs of the output buffers 3 and 5 are produced at the output terminals 6 and 7 connected to the sources of the transistors Q5 and Q8 of the respective buffers. An MSM or PIN photo-diode is used as the photo-diode PD of the OEIC, and junction type field effect transistors (FET's), HEMT's, MISFET's or MESFET's are used as the transistors Q1~Q9.

The photo-diode PD is used for an application to light communication in a wavelength band of 1.3~1.6 μm, and it detects a light shorter than 1.6 μm. InP is used for the n-layer, and a photo-sensing layer of artificial grating GaInAs having a multi-layer periodic structure is sandwiched between the n-layer and the p-layer.

Figure 9:
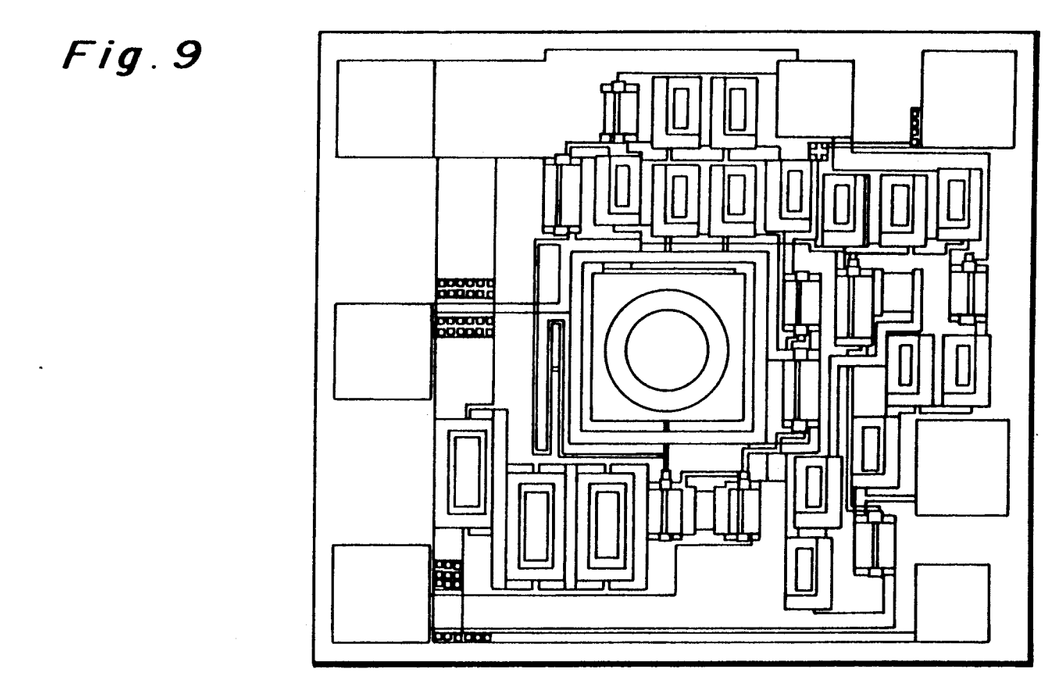
FIG. 9 shows a pattern on a substrate of the OEIC in the second embodiment of the present invention.
Figure 10:
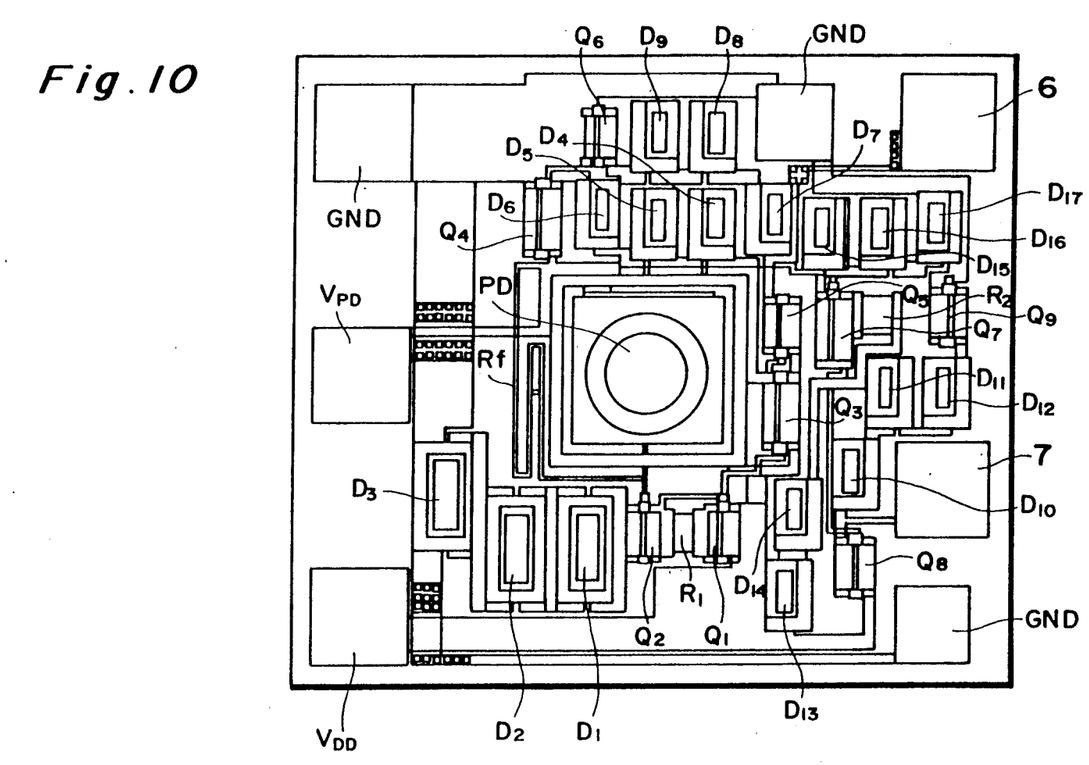
FIG. 10 shows a layout of elements on the substrate of the OEIC in the second embodiment of the present invention.

FIG. 9 shows a specific pattern used when the OEIC of FIG. 8 is formed on the InP substrate. FIG. 10 shows an arrangement of the elements of the OEIC. The photo-diode is arranged at substantially center of the chip, and pads are connected to pins of a package.

A basic operation of the OEIC of the present embodiment is briefly explained.

When a light signal is applied to the photo-diode PD, is amplified by the transistor Q2. The detection signal is inverted by the amplifier 1. A drain current of the transistor Q3 of the level shift circuit 2 reduces (off-state) in response to the output of the amplifier 1. The transistor Q5 of the output buffer 3 is turned off in response to the output signal of the level shift circuit 2 so that an L-level voltage is produced at the output terminal 6. On the other hand, the transistor Q3 of the level shift circuit 2 is turned off and the transistor Q7 of the inverting amplifier 4 is turned off accordingly. As a result, a voltage is applied to the gate of the transistor Q8 through the resistor R4 to turn it on, and an H-level voltage is applied to the output terminal 7. When the photo-diode PD does not detect the light signal, the respective elements operate in the opposite manner to that described above so that the H-level voltage is applied to the output terminal 6 and the L-level voltage is applied to the output terminal 7.

The operation of the present embodiment is similar to that of the first embodiment. When a noise is externally applied, the noise appears as the common mode noises because the circuit is on one chip. Since a difference between the output signal levels is always substantially constant without regard to the noise, it is eliminated by the differential input logic circuit connected to the output terminals 6 and 7.

The operation of the level shifting diodes D13~D17 of the inverting amplifier 4 of the OEIC of the present embodiment. This is described below.

A gain of the inverting amplifier 4 is determined by a product of a trans-conductance of the transistor Q7 and the resistor (load resistor) R4. Assuming that the trans-conductance of the transistor Q7 is approximately 6 ms and the resistance of the resistor R4 is approximately 155 ohm, the gain of the inverting amplifier 4 is approximately unity.

The diodes D13~D17 provide voltage drop of approximately 0.6 volt per diode. Accordingly, when two diodes are connected in series, the voltage drop is approximately 1.2 volt, and when three diodes are connected in series, the voltage drop is approximately 1.8 volt. In the inverting amplifier 4 shown in FIG. 8, the three series-connected diodes D15, D16 and D17 are inserted between the source of the transistor Q7 and the ground, and the two series-connected diodes D13 and D14 are inserted between the resistor R4 and the 5-volts power supply voltage VDD so that the total voltage drop is 3 volts. As a result, the voltage of 2 volts is applied across the transistor Q7 and the resistor R4.

On the other hand, a current flowing through the transistor Q7 is approximately 3 mA, and the voltage drop in the resistor R4 is approximately 0.5 volt. As result, a voltage applied between the source and the drain of the transistor Q7 is approximately 1.5 volt which is far below a breakdown voltage between the source and the drain of the transistor Q7, and the voltage breakdown of the transistor Q7 is prevented.

In the present embodiment, the three diodes are series-connected to the drain of the transistor Q7 of the inverting amplifier 4 and the two diodes are series-connected to the source. Alternatively, diodes or resistors may be connected to at least one of the source and the drain.

Figure 11:
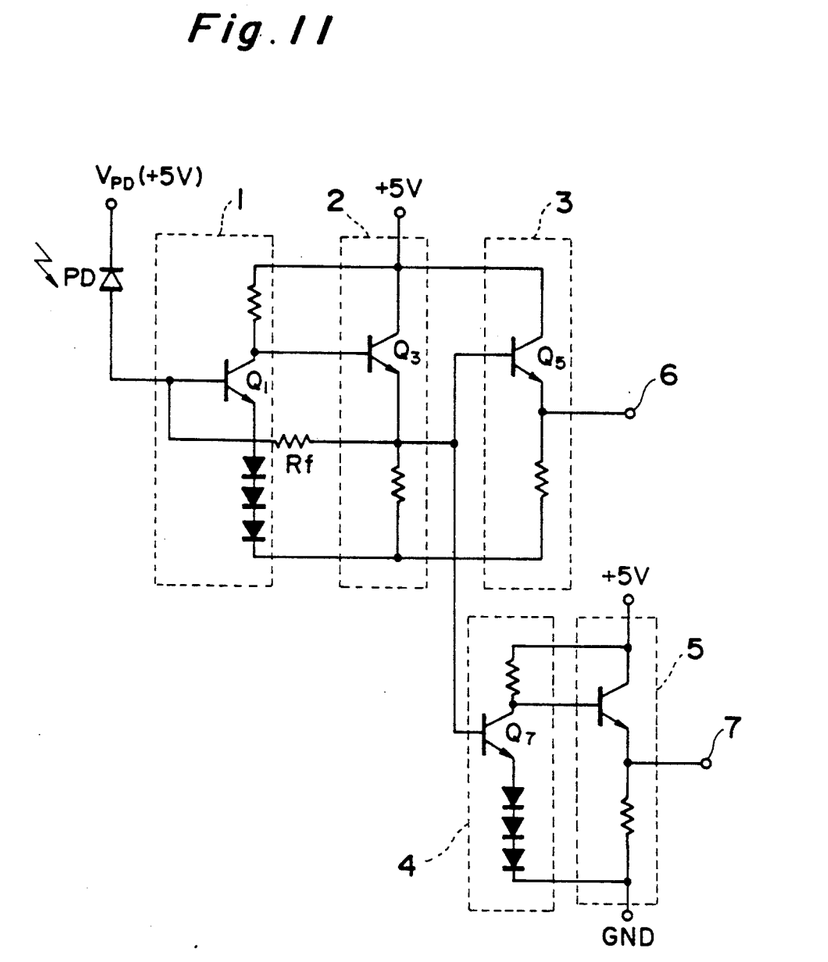
FIG. 11 shows a circuit diagram when the OEIC of the present invention is implemented by bipolar transistors.

In the present embodiment, the inverting amplifier is constructed by the field effect transistors. Where the inverting amplifier is constructed by bipolar transistors, the configuration of the present embodiment may also be applied to attain the same effects and advantages. FIG. 11 shows a configuration by bipolar transistors in which the respective blocks are similar to those of the previous embodiments.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A photo-electronic integrated circuit device comprising;

first and second output terminals for supplying first and second output signal of opposite polarities to an external differential input logic circuit;

a photo-detecting device for converting an input light signal to an electrical signal;

a first amplifier for amplifying the electrical signal of said photo-detecting device and outputting the same from said first output terminal as said first output signal; and a second amplifier for amplifying the output of said first amplifier and outputting said second output signal having the opposite phase to that of said first output signal, from said second output terminal.

2. A photo-electronic integrated circuit device according to claim 1 wherein said photo-electronic integrated circuit device is monolithically formed on an InP substrate.

3. A photo-electronic integrated circuit device according to claim 1 wherein output buffers are provided at outputs of said first and second amplifiers.

4. A photo-electronic integrated circuit device according to claim 3 wherein said output buffers are source followers including constant current circuits.

5. A photo-electronic integrated circuit device according to claim 1 further comprising a level shift circuit provided in the output of said first amplifier for shifting a voltage level of the output of said first amplifier to output said first output signal and the output to said second amplifier.

6. A photo-electronic integrated circuit device according to claim 1 wherein said first amplifier includes a signal amplifying transistor and a constant current circuit as a load to said transistor.

7. A photo-electronic integrated circuit device according to claim 6 wherein said transistor is one of J-FET, HEMT, MISFET and MESFET.

8. A photo-electronic integrated circuit device according to claim 1 wherein said second amplifier includes a signal amplifying transistor and a device having a predetermined voltage drop and connected to at least one of a drain or a collector, and a source or an emitter of said transistor.

9. A photo-electronic integrated circuit device according to claim 8 wherein said device having the predetermined voltage drop includes a plurality of series-connected diodes.

10. A photo-electronic integrated circuit device according to claim 9 wherein said device having the predetermined voltage drop includes a plurality of diodes and a resistor connected in series.

* * * * *